US006194052B1

(12) United States Patent
Knipstein

(10) Patent No.: US 6,194,052 B1
(45) Date of Patent: Feb. 27, 2001

(54) SOUNDABSORBING ELEMENT AND PROCEDURE FOR MANUFACTURE OF THIS ELEMENT AND USE OF THIS ELEMENT

(76) Inventor: Dale Knipstein, 5764-108 Russel Street North, Madoc, Ontario K0K 2K0 (CA)

( * ) Notice: Subject to any disclaimer, the term of this patent is extended or adjusted under 35 U.S.C. 154(b) by 0 days.

(21) Appl. No.: 09/101,895

(22) PCT Filed: Jan. 23, 1997

(86) PCT No.: PCT/SE97/00110

§ 371 Date: Jul. 20, 1998

§ 102(e) Date: Jul. 20, 1998

(87) PCT Pub. No.: WO97/27370

PCT Pub. Date: Jul. 31, 1997

(30) Foreign Application Priority Data

Jan. 25, 1996 (SE) .................................................. 9600273

(51) Int. Cl.[7] ........................................................ B32B 3/10

(52) U.S. Cl. .......................... 428/132; 428/131; 428/132; 428/137

(58) Field of Search .................................... 428/596, 597, 428/131, 132, 137; 181/284, 286, 293, 296; 29/163.6, 6.1, 17.2, 592, 890.01, 896.2, 896.6

(56) References Cited

U.S. PATENT DOCUMENTS

| | | | | |
|---|---|---|---|---|
| 1,536,666 | * | 5/1925 | Franz . | |
| 2,132,642 | * | 10/1938 | Parsons | 154/45 |
| 3,734,234 | * | 5/1973 | Wirt | 181/33 G |

* cited by examiner

*Primary Examiner*—Deborah Jones
*Assistant Examiner*—Lymarie Miranda
(74) *Attorney, Agent, or Firm*—Young & Thompson

(57) ABSTRACT

A soundabsorbing element consisting of a sheet of material with holes arranged in it. The sheet of material is self-supporting, and the holes are formed of microslits (1) that are distributed spaced from each other in the width and length of the sheet. Each slit has an elongated shape narrower at the ends at least part of the sheet close to each slit partly has been partly pressed out of the plane of the sheet. The microslits have a maximum width of approximately 0.01 to 0.8 mm and a length of 3–20 mm, preferably 4–10 mm, and most preferably 5–6 mm.

15 Claims, 3 Drawing Sheets

SOUNDABSORBING ELEMENT AND PROCEDURE FOR MANUFACTURE OF THIS ELEMENT AND USE OF THIS ELEMENT

FIELD OF THE INVENTION

This invention relates to a soundabsorbing element, how to manufacture it and how to use it.

BACKGROUND OF THE INVENTION

Different kinds of soundabsorbing elements are known in the technical field. Damping materials that are mounted in the ceiling often consist of a perforated plate with a soundabsorbing material in the form of absorbing felt or some other fiberbased material, placed on the backside of the plate. These plates are placed at a certain distance from the actual ceiling. This, and the fact that the soundabsorbing material itself requires space means that the available height in the room is reduced. Other types of acoustical tiles made of fibres, glassfibers or asbestos have disadvantages mainly during installation but, also during removal as handling them is health-hazardous. Foamed plastics are also used as absorbing elements. These materials have the obvious drawback that they are flammable. Plastic foams often have a short life following which they fall apart.

THE KNOWN PRIOR ART

In the Swedish patent 207 484 a soundabsorbing element for ceilings, walls or similar applications is described. The element according to the patent consists of a single plate or a long coil of material, that is given a great many openings arranged in parallel rows where the parts of the element lying between adjacent and parallel slits are pressed out of the plane of the plate, and said parts connected to the element by flaps. All the protruding parts are hereby situated in a plane parallel to but outside the plane of the plate. The openings are thus constituted by a similarly sized slits oriented perpendicular to the plane of the material. Each slit is thus adjacent to the plate and to the protrusion connected by flaps to the plate. These protrusions are oriented essentially parallel to the plate. If the upper surface of the pressed out protrusions still would be below the plates lower surface, the patent claims that no slits have been created, i.e. a solely vertically oriented slit through the plate is not considered included in the patent claims but the protrusion must be created in a way so that the protrusion essentially is pressed out beyond the surface of the plate.

A similar construction is known from the Swedish laid open publication 394 126 where a metal sheet is described which has a great number of protruding segments shaped like parallel ribs, each of the protruding segments consisting of a part of the metal plate that lies between two longitudinally oriented slits and where the cut surfaces of each protruding the segment are pushed out beyond the central plane of the plate.

Combinations of plates with penetrating slits of varying shapes in combination with a layer of soundabsorbing additional material are also known for instance form the Swedish laid open publication 325 694 and U.S. Pat. No. 2,009,512.

In addition to above mentioned plates there are various absorbent panels of pressed fibers and porous materials, in combination with plates, or separate.

A common feature in the known art is that the sound penetrates the plate through holes and slits of rather large size and that the plate itself works as a resonant absorber. In order to increase the energy losses further i.e. to increase the soundabsorption, an airflow resistance layer is placed behind the holes or slits.

These earlier types of perforated acoustic tiles are of the Helmholtz resonator type, i.e. a resonant absorber where a plate equipped with holes is arranged at a certain distance from a rigid wall.

In an article by H. V. Fuchs, Einsatz mikroperforierter Platten als schallabsorber mit inhärenter Dämpfung, Acustica vol. 81 (1995), p. 107–116 the theory of another type of sound absorbers is described.

In the article it is described how a microperforated plate can be used to achieve a broadband absorption. The theory behind this is that the vibrations in the air (=the sound) is effectively damped by the influence of the shearforces inside the small holes and that in this way a broadband absorption is achieved without using additional fibres or other porous materials. The holes in the article are produced by using a laser beam.

In the above cited article it is concluded, however, that the cost for producing these plates is considerable and when using stiff and or thick materials cost considerations make their use impossible. The theory of microholes has been discussed since 1950 but the difficulties of making so many and so small perforations has prevented the practical use of micro-holes as a sound absorbing means.

Thus it has been shown that sounddamping elements according to the state of the art, for instance Helmholtz type resonators, beside the first mentioned drawbacks, also have the disadvantage that a combination of materials must be used in order to achieve a desirable absorption over a wide frequency range.

I has also been shown that sounddamping elements using microperforations are very expensive to manufacture by for instance using a laser beam as in the above mentioned article.

OBJECTS OF THE INVENTION

The main object with this invention is to achieve a soundabsorbing element, having broadband absorption characteristics, that consists of a single plate that is easy to install and easy to manufacture, and requires no additional layer of fiber or the like.

Another object is to achieve a soundabsorbing element that easily can be formed in two or three dimensions, that is weldable and that is easily cleaned even with high pressure spray objects or other cleaning techniques including different kinds of detergents.

Another object is to achieve a soundabsorbing element that is economically advantageous because of the way it is manufactured.

Another object is to achieve a soundabsorbing element which is fire-resistant and can withstand hard conditions e.g. corrosive environments.

Yet another purpose is to achieve a soundabsorbing element that has a decorative effect.

SUMMARY OF THE INVENTION

It has now been surprisingly shown that with a soundabsorbing element according to the invention, and a way to produce this soundabsorbing element it is possible to achieve excellent sound absorption over essentially the whole of the actual band width. The above shown purposes are achieved by an element and a way of producing it which are characterised by the characterising parts of claims 1 and 8.

With the element and the process a simple and uncomplicated element is achieved that is easy to produce and mount and that withstands high temperatures, that withstands demanding chemical environments and that is self-supporting.

The element according to the invention is formable and can be welded and is thin, lightweight, and flexible to mount.

The element according to the invention is moreover adjustable to different acoustic requirements by varying number of slits per $m^2$ and also by varying the slit shape. Moreover it is possible to foresee the performance which means that an element or element system can be tailored to different needs.

The element has also shown to be very effective at damping machine noise. It can thus be used in engine compartments, in machine tools and vehicles. When used in soundmufflers, part or the whole muffler, can be made of the element according to the invention.

The suitability of the element for the above mentioned applications does not only depend on the excellent formability and the possibility to join the element to metal constructions by well-known techniques as for instance welding, but also on properties such as fire resistance and washability.

Additional features of the element and the process according to the invention are claimed in the dependent claims.

BRIEF DESCRIPTION OF THE DRAWINGS

The invention is described below with reference to the enclosed drawings in which.

DETAILED DESCRIPTION OF THE INVENTION

Figure 1:
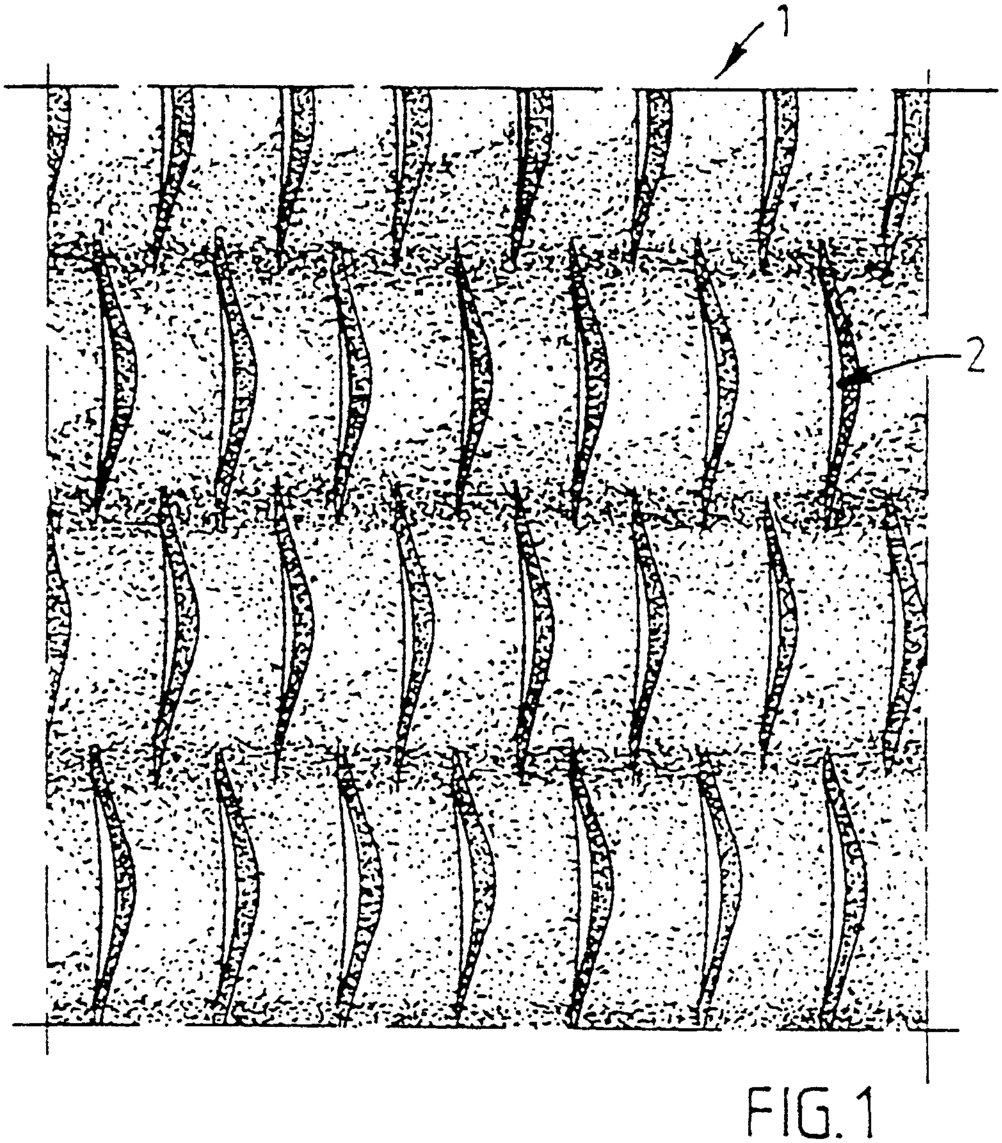
FIG. 1 shows a plan view of one embodiment of a part of an element according to the invention

In FIG. 1 is shown a plane view of a part of an embodiment according to the invention of a soundabsorbing element 1 with microslits 2. The pattern formed by the slits constitutes only one example of many possible placements of the slits. The mutual relationship between the slits is, among others, dependent on how large a part of the surface the slits form. The pattern can of course be created with the purpose of achieving a special decorative effect without taking away the possibility of varying the shape of the slits and their number so that the desired soundabsorption is achieved. The slits on the element shown in FIG. 1 are located in rows, and these row are mutually displaced. Through this pattern the elements' stiffness is enhanced since it becomes slightly corrugated, meaning of course that the thinner material can be used than without the corrugation.

Figure 2:
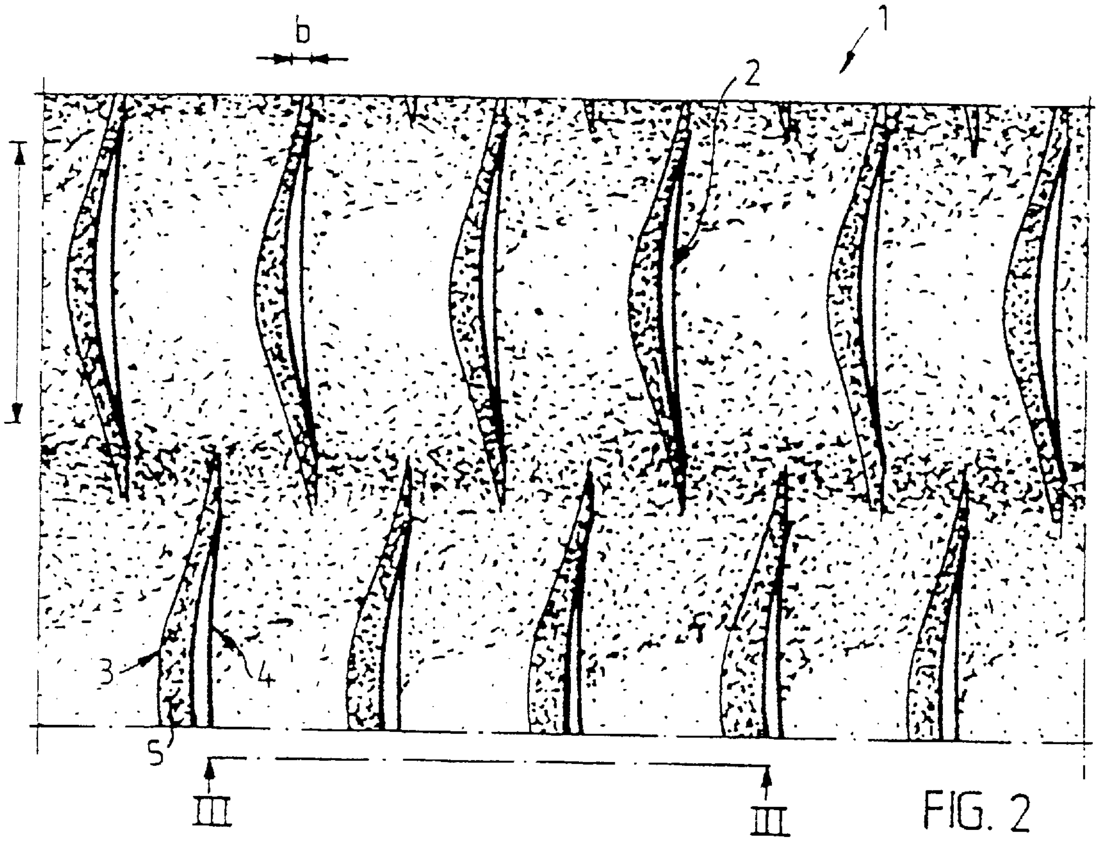
FIG. 2 shows a magnified partial surface of the element of FIG. 1 corresponding to an area of ca 4 $cm^2$

FIG. 2 is a magnification of FIG. 1 where the slits can be seen in more detail. The maximum width b and length l of the microslits have been marked in the figure. The microslits in the shown embodiment have been accomplished machining the coil of material with a cutting tool with one edge that has a wavy shape against another edge. With a suitable pressure at the materialplane the slits 2 are created, with a first and second slit edge, 3 resp. 4, where the protruding teeth on the edge of the tool are pressed against the material plane, which at a certain shearforce at one edge 3 of the slit will be partly pressed out of the plane and the slit 2 created. The part 5 shows the slit edge 3 slightly deformed by the operation. The other slit edge 4 cannot be seen in the figure. This machining of the material may be performed by several types of cutting arrangements.

In this cutting operation it is of course assumed that the pressure is controlled so that the length and size of the slits is that intended and that the material is not cut off. To determine the right parameters for the cutting operation can be done by a skilled man within the frame of the invention. By displacing the teethed tool edge in the example shown, in each consecutive row by half of the wavelength between the teeth, the slits will have a zigzag pattern in the longitudinal direction.

Figure 3:
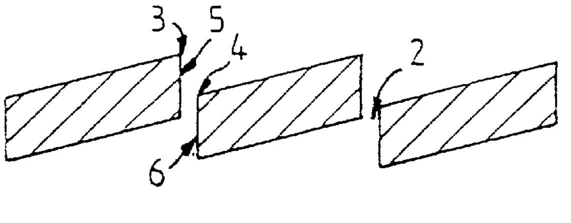
FIG. 3 shows a profile corresponding to the marked line in FIG. 2 through a number of slits where they are at their widest

FIG. 3 show schematically a section along the line III—III in FIG. 2. In the figure it can be seen that the microslits 2 are oriented perpendicular to the material plane 1. The partial deformation of the metal caused by the shearing operation has been disregarded in this figure. In the shearing operation to make the slit 2 the shear surface 6 is pressed out more than the thickness of the material plane. Subsequently, the protrusions are rolled so that they say in a desired position, more or less protruding out of the material plane.

By studying the figures, especially FIG. 2, the shape of the microslits can be determined. The slits have an elongated shape narrower at the ends and lying essentially in the plane of the element. Because of the varying width of the slits a wide frequency range will be absorbed, i.e. soundwaves with different wavelength will be obstructed by different slitwidths.

A suitable length for the slits lies between 3 and 20 mm. Good results are achieved with lengths of 4–10 mm and with lengths of about 5–6 mm good results are achieved. The maximum width of the slits in the plane of the element can vary between 0.01–0.8 mm, preferably between 0.05 and 0.5 mm with a most preferred width of 0.1 to 0.4 mm.

Figure 4:
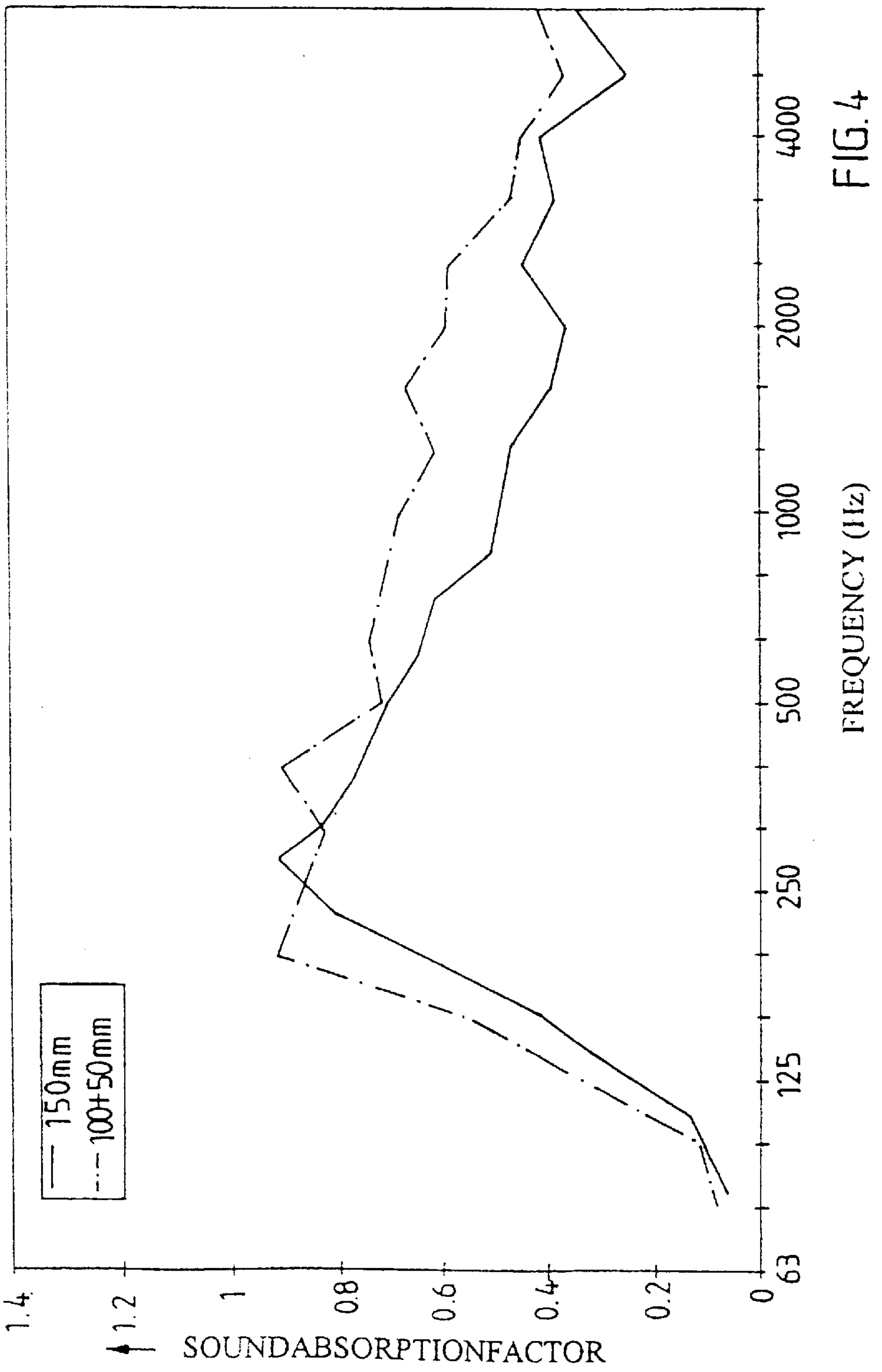
FIG. 4 shows two comparative curves of the variation of absorptionfactor, with frequency for two embodiments of the element according to the invention.

Two curves showing the soundabsorption from two different embodiments of the invention are shown in FIG. 4. The solid line A show an absorption curve where the element has been mounted according to ISO 356 at distance of 150 mm from the wall. Curve B shows the absorption when two identical elements been mounted on top of each other, one of distance of 100 mm and the other at 150 mm form the wall. All of the elements used in the measurements were identically designed, i.e. the same sign and number of slits on all the elements used. From the diagram it can be concluded that by mounting two single elements on top of each other, a better absorption is achieved over essentially the whole frequency range compared to using one single element. Similar curves measured on differently designed elements (different slit size and density) will give somewhat different curves, although the general results of multiple elements will essentially be as the shown example.

The materials from which the elements are manufactured are preferably metals. Examples of the like are stainless steel, aluminium and aluminium alloys. Of course other metals or alloys can also be used. It is conceivable that in certain applications suitable plastic materials can be used.

The element according to the invention can of course be manufactured as ready-to-install different sized modules as well as in the form of rolls or sheets that later will be cut to fit for the desired purpose. The element may also, independent of the slits be formed in such a way as to stiffen the element, e.g. by folding etc. The ready made modules can, as is obvious to the skilled man, be provided with frames, fasteners etc. Other modifications can be made by the skilled man without circumvent the inventive concept as expressed in the following patent claims.

What is claimed is:

1. A soundabsorbing element consisting of a sheet of material with holes arranged in it, wherein the sheet of material is self-supporting, the holes are formed of microslits (1) that are distributed spaced from each other in the width and length of the sheet, each slit having an elongated shape narrower at the ends and lying essentially in the plane of the element, and wherein at least part of the sheet close to each slit partly has been partly pressed out of the plane of the sheet.

2. Soundabsorbing element according to claim 1, wherein the microslits have a maximum width of approximately 0.01 to 0.8 mm.

3. Soundabsorbing element according to claim 1, wherein the lengths of the microslits are 3–20 mm.

4. Soundabsorbing element according to claim 1, wherein the material sheet has a degree of perforation of 10–40%.

5. Soundabsorbing element according to claim 1, wherein the material sheet has a thickness of 0.1–10 mm.

6. Soundabsorbing element according to claim 1, wherein the material sheet is made of metal.

7. Soundabsorbing element according to claim 1 wherein the material sheet is made from plastic material.

8. Soundabsorbing element system wherein at least two single elements according to claim 1 are joined to form a unit.

9. A soundabsorbing element comprising a sheet of material with holes arranged in it, wherein the sheet material is self supporting, the holes are formed of microslits that are distributed spaced apart from each other in the width and length of the sheet, wherein at least part of the sheet close to each slit has been partly pressed out of the plane of the sheet, wherein each slit has an elongated shape narrower at the ends, and wherein the microslits have a maximum width of about 0.01 to 0.8 mm.

10. A soundabsorbing element according to claim 9, wherein said maximum width is about 0.05 to 0.5 mm.

11. A soundabsorbing element according to claim 9, wherein said maximum width is about 0.1 to 0.4 mm.

12. A soundabsorbing element according to claim 9, wherein the length of the microslits is 3 to 20 mm.

13. A soundabsorbing element comprising a sheet of material with holes arranged in it, wherein the sheet material is self supporting, the holes are formed of microslits that are distributed spaced apart from each other in the width and length of the sheet, wherein at least part of the sheet close to each slit has been partly pressed out of the plane of the sheet, wherein each slit has an elongated shape narrower at the ends, and wherein the length of the microslits is 3 to 20 mm.

14. A soundabsorbing element according to claim 13, wherein the length of the microslits is 4 to 10 mm.

15. A soundabsorbing element according to claim 13, wherein the length of the microslits is 5 to 6 mm.

* * * * *